US011937639B2

(12) United States Patent
Liu

(10) Patent No.: US 11,937,639 B2
(45) Date of Patent: Mar. 26, 2024

(54) ELECTRONIC CIGARETTE

(71) Applicant: Shenzhen Eigate Technology Co., Ltd., Shenzhen (CN)

(72) Inventor: Tuanfang Liu, Shenzhen (CN)

(73) Assignee: ASPIRE NORTH AMERICA LLC

( * ) Notice: Subject to any disclaimer, the term of this patent is extended or adjusted under 35 U.S.C. 154(b) by 393 days.

(21) Appl. No.: 17/164,771

(22) Filed: Feb. 1, 2021

(65) Prior Publication Data

US 2022/0095683 A1 Mar. 31, 2022

(30) Foreign Application Priority Data

Sep. 27, 2020 (CN) ......................... 202011034246.2
Sep. 27, 2020 (CN) ......................... 202022155733.6

(51) Int. Cl.

| | |
|---|---|
| ***A24F 40/46*** | (2020.01) |
| ***A24F 40/20*** | (2020.01) |
| ***A24F 40/48*** | (2020.01) |
| ***H05B 6/80*** | (2006.01) |

(52) U.S. Cl.

CPC .............. *A24F 40/46* (2020.01); *A24F 40/48* (2020.01); *H05B 6/80* (2013.01); *A24F 40/20* (2020.01)

(58) Field of Classification Search

CPC .......... A24F 40/20; A24F 40/40; A24F 40/46; A24F 40/48; H05B 6/80
See application file for complete search history.

(56) References Cited

FOREIGN PATENT DOCUMENTS

CN 108552613 A * 9/2019 ........... A24F 47/008

OTHER PUBLICATIONS

CN108552613A—Espacenet Mach English Translation (Year: 2018).*

* cited by examiner

*Primary Examiner* — Christopher M Rodd
*Assistant Examiner* — Ronnie Kirby Jordan
(74) *Attorney, Agent, or Firm* — MATTHIAS SCHOLL P.C.; Matthias Scholl

(57) ABSTRACT

An electronic cigarette includes a microwave heating module and an aerosol generator. The microwave heating module includes a cup, a cylindrical shielding net, a magnetron, and a microwave source. The cup is fixed in the cylindrical shielding net for accommodating a tobacco material. The cylindrical shielding net is disposed above the microwave source. The magnetron is disposed on the microwave source. In a power-on state, the magnetron emits microwave. The microwave is released via the microwave source into the cylindrical shielding net to heat and atomize the tobacco material in the cup. The microwave heating module is disposed in the aerosol generator.

7 Claims, 5 Drawing Sheets

| Technical parameters table of microwave heating | | | |
|---|---|---|---|
| ID | Name | Specifications | Note |
| 1 | Rated power | 2.0～260W | |
| 2 | Voltage | 3.7～14.8V | AC&DC |
| 3 | Heating temperature | 100～350°C | |
| 4 | Microwave frequency | 2400～2500 MHz | |
| 5 | Cell number | 1～4PCS | Lithium cell |
| 6 | Cell capacity | 2200 mA.h | Single cell capacity |
| 7 | Cell model | 18650 | Lithium cell |

FIG. 5

ELECTRONIC CIGARETTE

CROSS-REFERENCE TO RELATED APPLICATIONS

Pursuant to 35 U.S.C. § 119 and the Paris Convention Treaty, this application claims foreign priority to Chinese Patent Application No. 202011034246.2 filed on Sep. 27, 2020, and to Chinese Patent Application No. 202022155733.6 filed on Sep. 27, 2020. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to an electronic cigarette.

Conventional electronic cigarettes include a heating wire to heat and atomize the tobacco material. In general, the heating wire is directly immersed into the tobacco material. The direct contact of the heating wire and the tobacco material may degrade the quality of the tobacco material.

SUMMARY

The disclosure provides an electronic cigarette, comprising a microwave heating module and an aerosol generator; the microwave heating module comprises a cup, a cylindrical shielding net, a magnetron, and a microwave source; the cup is fixed in the cylindrical shielding net for accommodating a tobacco material; the cylindrical shielding net is disposed above the microwave source; the magnetron is disposed on the microwave source; in a power-on state, the magnetron emits microwave; the microwave is released via the microwave source into the cylindrical shielding net to heat and atomize the tobacco material in the cup; and the microwave heating module is disposed in the aerosol generator.

In a class of this embodiment, the microwave heating module further comprises a cover; the cover is disposed on the cylindrical shielding net so as to hold the microwave emitted by the microwave source in the cylindrical shielding net, thereby concentrating the microwave energy on the tobacco material and improving the heating efficiency.

In a class of this embodiment, the microwave heating module comprises a control panel and a battery; the battery is soldered on an input end of the control panel; an output end of the control panel is soldered to an input end of the microwave source for inputting alternating current to the microwave source so that the magnetron emits the microwave.

In a class of this embodiment, the microwave heating module further comprises a silicone sleeve; the silicone sleeve is disposed around the microwave source; and the magnetron on the microwave source is exposed out of the silicone sleeve.

In a class of this embodiment, the cup comprises a non-metallic material including but not limited to glass, ceramics, quartz, crystal, agate, and jade, and a metal material, and the cup is in the shape of a cylinder, oval, or convex pot.

In a class of this embodiment, the aerosol generator comprises a sleeve, and the microwave heating module is fixed in the sleeve.

In a class of this embodiment, the aerosol generator comprises a housing and a button; the sleeve comprises an upper part exposed out of the housing and a lower part disposed in the housing; the button is disposed on the control panel and exposed out of a side wall of the housing; and the button is configured to switch on a power source.

In a class of this embodiment, the electronic cigarette further comprises a mouthpiece; the mouthpiece is disposed on the sleeve; the sleeve comprises at least one air vent; when in use, air enters the cylindrical shielding net via the at least one air vent of the sleeve and drives vapor resulting from the atomization of the tobacco material in the cup by the microwave to flow from the cover to the mouthpiece for user's inhaling.

BRIEF DESCRIPTION OF THE DRAWINGS

FIG. 5 shows electrical parameters of an electronic cigarette in accordance with one embodiment of the disclosure.

DETAILED DESCRIPTION

To further illustrate, embodiments detailing an electronic cigarette are described below. It should be noted that the following embodiments are intended to describe and not to limit the disclosure.

Principle of microwave heating: microwave heating is a multiphysics phenomenon that involves electromagnetic waves and heat transfer; any material that is exposed to electromagnetic radiation will be heated up owing to the collision between the material molecules. The rapidly varying electric and magnetic fields lead to sources of heating.

Figure 1:
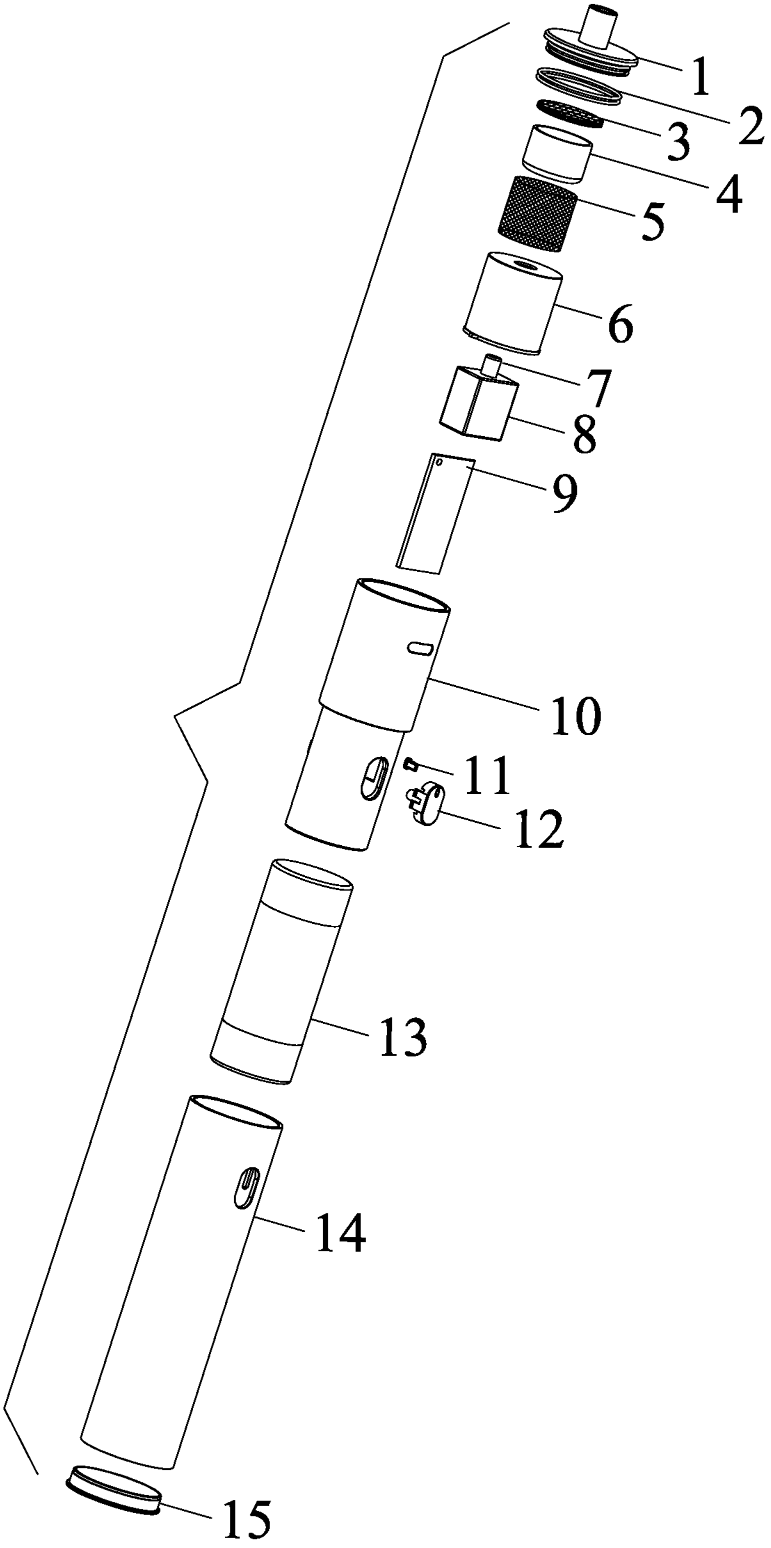
FIG. 1 is an exploded view of an electronic cigarette in accordance with one embodiment of the disclosure.
Figure 2:
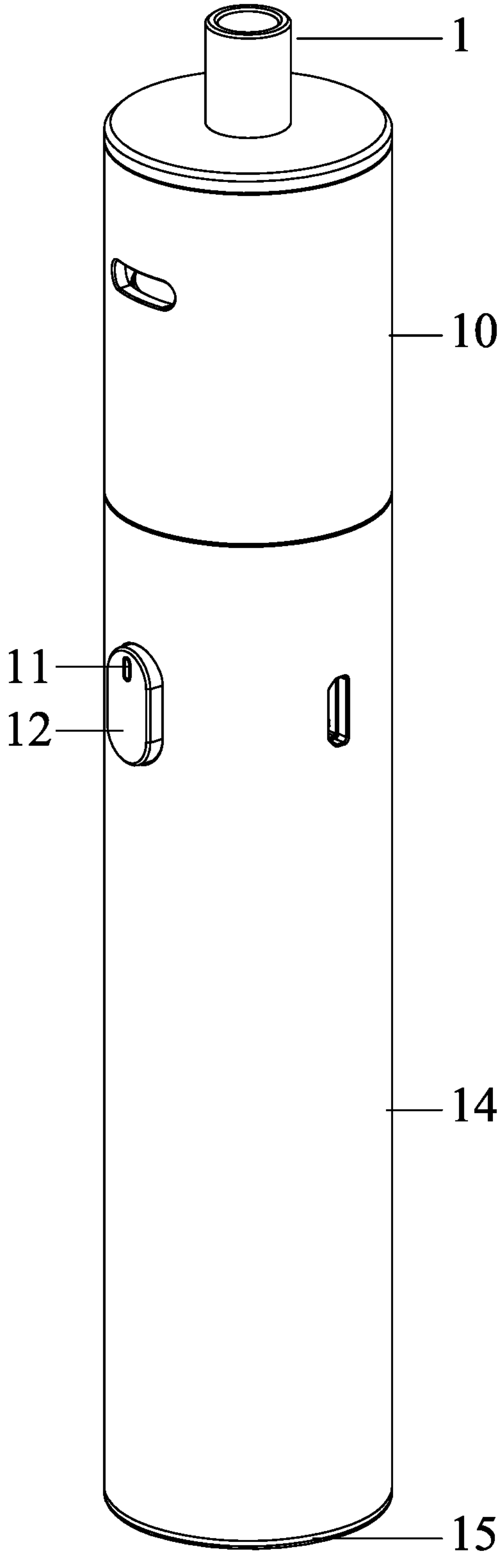
FIG. 2 is a schematic diagram of an electronic cigarette in accordance with one embodiment of the disclosure.
Figure 3:
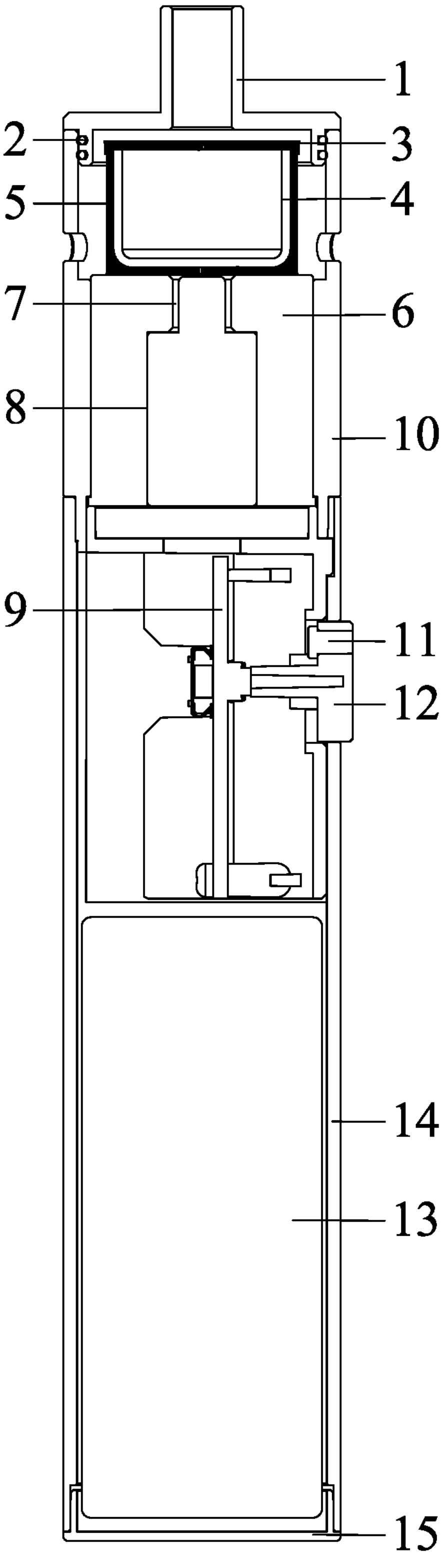
FIG. 3 is a sectional view of an electronic cigarette in accordance with one embodiment of the disclosure.
Figure 4:
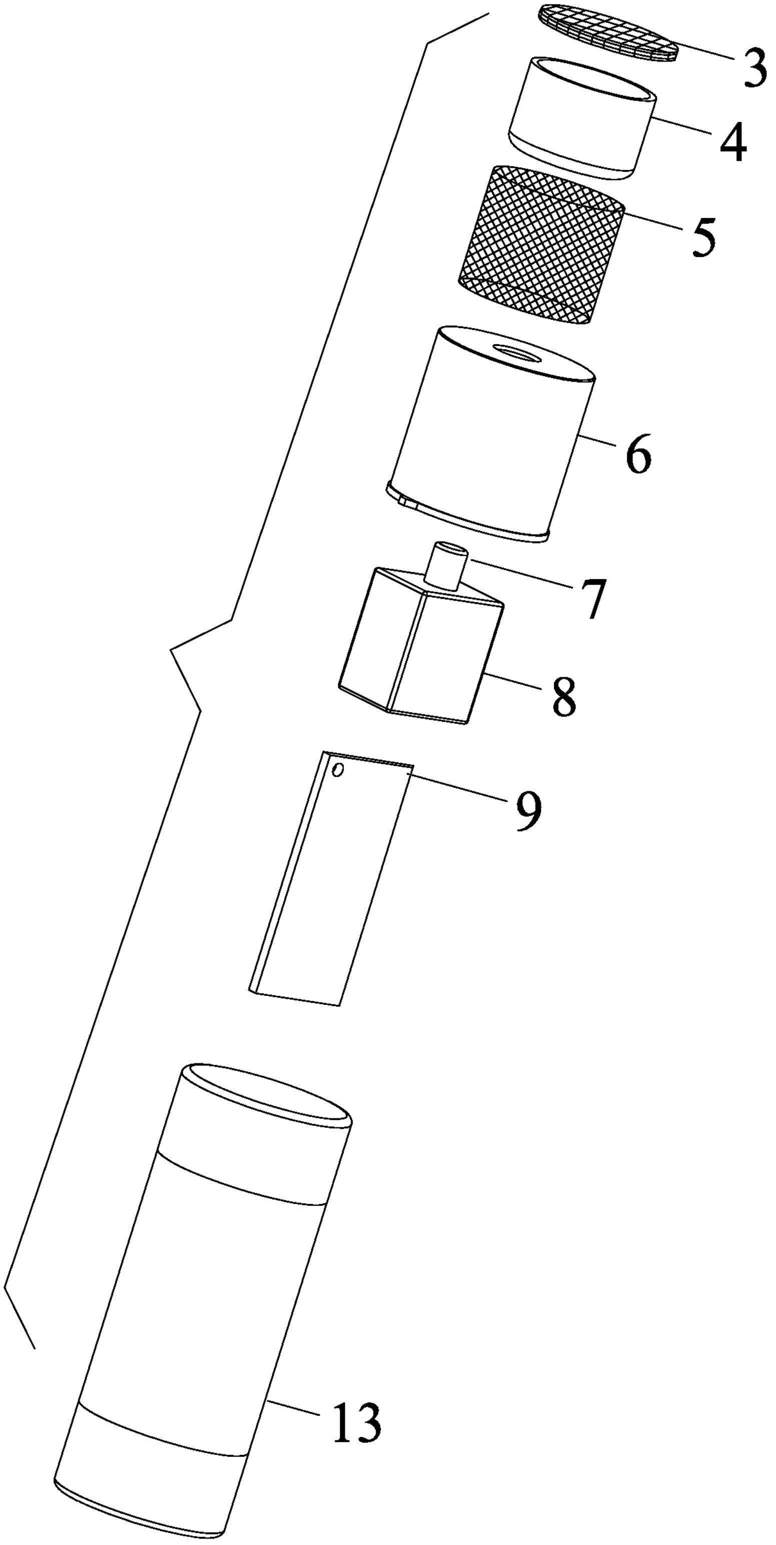
FIG. 4 is a schematic diagram of a microwave heating module of an electronic cigarette in accordance with one embodiment of the disclosure.

As shown in FIGS. 1-5, the disclosure provides an electronic cigarette comprises a mouthpiece 1, a first seal ring 2 sealing the mouthpiece, a cover 3, a cup 4, a cylindrical shielding net 5, a silicone sleeve 6, a magnetron 7, a microwave source 8, a control panel 9, a sleeve 10, a light guide 11, a button 12, a battery 13, a housing 14, and an end cover 15. The magnetron 7 is disposed on the microwave source 8. The microwave source 8 is fixed in the silicone sleeve 6, and the magnetron 7 is exposed out of the silicone sleeve 6. The silicone sleeve 6 is fixed in the upper part of the sleeve 10. The cup 4 is fixed in the cylindrical shielding net 5. The cover 3 is disposed on the cylindrical shielding net 5 to hold the microwave released by the microwave source 8 in the cylindrical shielding net 5, thereby concentrating the microwave energy on the tobacco material and improving the heating efficiency. The cylindrical shielding net 5 is disposed on the upper part of the sleeve 10 and above the magnetron 7 and the microwave source 8. The control panel is fixed on the lower part of the sleeve 10. The input end of the control panel 9 is soldered on the positive and negative terminals of the battery 13. The battery 13 supplies power for the control panel 9, and a charge control circuit on the control panel 9 controls whether or not to charge the battery 13. The output end of the control panel 9 is soldered to the input end of the microwave source 8 for inputting alternating current to the microwave source 8 and thus the magnetron 7 emits microwave. The light guide 11 is disposed in the button 12 and is lighted up when the power is on. The button 12 is disposed on the switch contact of the body of the control panel 9 to switch on the power and trigger the electronic cigarette to work. The battery 13 and the lower part of the sleeve 10 are disposed in the housing 14, and the upper part of the sleeve is exposed out of the housing 14. The button 12 is exposed out of the side wall of the housing 14. The first seal ring 2 is disposed on the mouthpiece 1 to seal the space between the mouthpiece 1 and the top opening of the sleeve 10. The mouthpiece 1 is disposed in the top opening of the sleeve 10. The end cover 15 is fixed on the bottom end of the housing 14.

In certain embodiments, the battery 13 comprises 1-4 18650-type lithium cells, and each cell is 2200 mA·h. The output power range of the microwave source is 2.0-260 W, the voltage range is AC: 3.7-14.8V, the temperature range is 100-350° C., and the microwave frequency is 2400-2500 Mhz.

The following advantages are associated with the electronic cigarette of the disclosure:

1. The electronic cigarette uses microwave to heat and atomize tobacco material instead of conventional heating wires, which is novel.
2. The cover is disposed on the cylindrical shielding net so as to hold the microwave emitted by the microwave source in the cylindrical shielding net, thereby concentrating the microwave energy on the tobacco material and improving the heating efficiency.
3. The tobacco material is stored in the cup and the heat source is microwave, which is environmentally friendly and will not degrade the quality of the tobacco material.

It will be obvious to those skilled in the art that changes and modifications may be made, and therefore, the aim in the appended claims is to cover all such changes and modifications.

What is claimed is:

1. An electronic cigarette, comprising a microwave heating module, wherein the microwave heating module comprises a cup, a cylindrical shielding net, a cover, a magnetron, and a microwave source;

wherein:

the cup is fixed in the cylindrical shielding net for accommodating a tobacco material;

the cylindrical shielding net is disposed above the microwave source;

the magnetron is disposed on the microwave source; the microwave source is adapted to activate microwaves in a power-on state, and the magnetron is adapted to emit the microwaves into the cylindrical shielding net to heat and atomize the tobacco material in the cup;

the cover is disposed on the cylindrical shielding net, and a shielding chamber is confined by the cylindrical shielding net and the cover;

each of the cylindrical shielding net and the cover is in a mesh configuration and has a plurality of mesh holes;

the cylindrical shielding net and the cover are adapted to convey air or vapor through the mesh holes;

the cylindrical shielding net and the cover are adapted to confine the microwaves within the shielding chamber and to concentrate the microwaves on the tobacco material in the cup; and the cup comprises a non-metallic material selected from glass, ceramic, quartz, crystal, agate, and jade.

2. The electronic cigarette of claim 1, wherein the microwave heating module comprises a control panel and a battery; the battery is soldered on an input end of the control panel; an output end of the control panel is soldered to an input end of the microwave source for inputting alternating current to the microwave source so that the magnetron emits the microwave.

3. The electronic cigarette of claim 2, wherein the microwave heating module further comprises a silicone sleeve; the silicone sleeve is disposed around the microwave source; and the magnetron on the microwave source is exposed out of the silicone sleeve.

4. The electronic cigarette of claim 3, wherein the cup is in the shape of a cylinder, oval, or convex pot.

5. The electronic cigarette of claim 4, further comprising a sleeve, wherein the microwave heating module is fixed in the sleeve.

6. The electronic cigarette of claim 5, further comprising a housing and a button; wherein the sleeve comprises an upper part exposed out of the housing and a lower part disposed in the housing; the button is disposed on the control panel and exposed out of a side wall of the housing; and the button is configured to switch on a power source.

7. The electronic cigarette of claim 6, further comprising a mouthpiece, wherein the mouthpiece is disposed on the sleeve; the sleeve comprises at least one air vent; when in use, air enters the cylindrical shielding net via the at least one air vent of the sleeve and drives vapor resulting from the atomization of the tobacco material in the cup by the microwave to flow from the cover to the mouthpiece for user's inhaling.

* * * * *